(12) United States Patent
Notsu (10) Patent No.: US 11,400,761 B2
(45) Date of Patent: Aug. 2, 2022

(54) TIRE

(71) Applicant: SUMITOMO RUBBER INDUSTRIES, LTD., Hyogo (JP)

(72) Inventor: Ryoji Notsu, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 196 days.

(21) Appl. No.: 16/281,664

(22) Filed: Feb. 21, 2019

(65) Prior Publication Data

US 2019/0270343 A1 Sep. 5, 2019

(30) Foreign Application Priority Data

Mar. 2, 2018 (JP) .............................. JP2018-037221

(51) Int. Cl.
*B60C 11/01* (2006.01)
*B60C 13/02* (2006.01)
*B60C 13/00* (2006.01)

(52) U.S. Cl.
CPC ............ *B60C 11/01* (2013.01); *B60C 13/002* (2013.01); *B60C 2011/013* (2013.01)

(58) Field of Classification Search
CPC ....... B60C 11/01; B60C 13/002; B60C 13/02; B60C 13/00; B60C 13/001; B60C 13/003; B60C 13/023; B60C 2011/013
See application file for complete search history.

(56) References Cited

U.S. PATENT DOCUMENTS

| | | | |
|---|---|---|---|
| 3,482,616 A | 12/1969 | French | |
| 4,144,921 A * | 3/1979 | Yabuta | B60C 11/01 116/34 R |
| 5,769,976 A * | 6/1998 | Omokawa | B29C 33/0038 152/209.18 |
| 2003/0041939 A1 * | 3/2003 | Allison | B60C 11/0316 152/209.1 |

(Continued)

FOREIGN PATENT DOCUMENTS

| | | | |
|---|---|---|---|
| DE | 102014214988 A1 * | 2/2016 | ......... B60C 11/0311 |
| EP | 2368725 A2 | 9/2011 | |

(Continued)

OTHER PUBLICATIONS

Osaki, Machine Translation of JP-2006256433-A (Year: 2006).*

(Continued)

*Primary Examiner* — Justin R Fischer
(74) *Attorney, Agent, or Firm* — Greenblum & Bernstein, P.L.C.

(57) ABSTRACT

A tire includes a projection disposed between a tread end and a maximum width position on a side surface. The projection includes a groove that extends through an outer side surface in a circumferential direction. The tire is preferably produced by using a mold which has a first part and a second part and in which a dividing line between the first and the second parts extends in the circumferential direction and comes into contact with the side surface, and the groove preferably overlaps an imaginary line, on the side surface, corresponding to the dividing line. A width of the groove is preferably not less than 1.5 mm and preferably not greater than 3.0 mm.

15 Claims, 6 Drawing Sheets

(56) References Cited

U.S. PATENT DOCUMENTS

2004/0055683 A1* 3/2004 Feider .................. B60C 11/01
152/209.16
2014/0138002 A1* 5/2014 Katayama ............. B60C 9/28
152/454
2018/0229557 A1 8/2018 Buffetaud et al.

FOREIGN PATENT DOCUMENTS

| EP | 3332991 A1 | | 6/2018 | | |
|----|------------|---|--------|---|---|
| FR | 1546547 A | | 11/1968 | | |
| FR | 3027256 A1 | | 4/2016 | | |
| FR | 3044970 A1 | * | 6/2017 | ............. | B60C 13/02 |
| JP | 2001225613 A | * | 8/2001 | ........... | B60C 13/002 |
| JP | 2003-211915 A | | 7/2003 | | |
| JP | 2004306873 A | * | 11/2004 | | |
| JP | 2006256433 A | * | 9/2006 | | |
| JP | 2007-022367 A | | 2/2007 | | |
| JP | 2007022367 A | * | 2/2007 | | |
| JP | 2008-254661 | * | 10/2008 | | |
| JP | 2012-6499 A | | 1/2012 | | |
| JP | 2013-82262 | * | 5/2013 | | |
| JP | 2013-159233 | * | 8/2013 | | |
| JP | 2014-076769 | * | 5/2014 | | |
| JP | 2016-198999 A | | 12/2016 | | |
| JP | 2016198999 A | * | 12/2016 | | |
| WO | 01/17801 A1 | | 3/2001 | | |
| WO | 2010/061578 A1 | | 6/2010 | | |
| WO | WO-2015154895 A1 | * | 10/2015 | ............. | B60C 13/02 |

OTHER PUBLICATIONS

Nakano, Machine Translation of JP-2007022367-A (Year: 2007).*
Kaji, Machine Translation of JP-2004306873-A (Year: 2004).*
Komori, Machine Translation of JP-2016198999-A (Year: 2016).*
Nakano, JP-2007022367-A Machine Translation (Year: 2007).*
Rittweger, WO-2015154895-A1 Machine Translation (Year: 2015).*
Komori, JP-2016198999-A Machine Translation (Year: 2016).*
Machine translation of JP 2013-159233, 2013.*

* cited by examiner

TIRE

This application claims priority on Patent Application No. 2018-037221 filed in JAPAN on Mar. 2, 2018. The entire contents of this Japanese Patent Application are hereby incorporated by reference.

BACKGROUND OF THE INVENTION

Field of the Invention

The present invention relates to tires.

Description of the Related Art

A side surface of a tire may collide against an obstacle such as a curb and the like, or hit against a stone. A sidewall of the side surface of the tire is formed from crosslinked rubber having excellent cut resistance in order to prevent damage due to the collision or hitting.

A projection may be disposed, on the side surface, between a tread end and the maximum width position at which the tire width is largest, in order to improve the cut resistance. The projection projects from the side surface. The projection comes into contact with an obstacle or the like to protect the side surface. Furthermore, the projection contributes to outer appearance of the tire. The projection enhances the outer appearance of the tire. Study about a tire having a projection on the side surface is reported in JP2012-6499.

Cut resistance can be enhanced by enlarging the projection. A large projection can contribute to enhancing of outer appearance. When a tire rolls, deformation is great in the side surface between the tread end and the maximum width position. The greater the projection is, the greater distortion in the outer side surface of the projection is. A projection which is prevented from being damaged due to this distortion while contributing to good cut resistance and outer appearance is required.

An object of the present invention is to provide a tire which has good cut resistance and outer appearance and is also prevented from being damaged.

SUMMARY OF THE INVENTION

A tire of the present invention includes: a projection disposed on a side surface of the tire between a tread end and a maximum width position. The projection includes a groove that extends through an outer side surface of the projection in a circumferential direction.

In the tire of the present invention, the projection is disposed between the tread end and the maximum width position on the side surface. The projection has the groove that extends through the outer side surface in the circumferential direction. The groove effectively reduces distortion of the outer side surface of the projection. In the tire, even when the projection is enlarged, the outer side surface of the projection is prevented from becoming an originating point of damage. The large projection contributes to good cut resistance and outer appearance. In the tire, damage is prevented while good cut resistance and outer appearance are obtained.

The groove is preferably disposed in a region in which a distance from an outer side end of the tire is 15% to 45% of a cross-sectional height H1 of the tire in a radial direction.

A width of the groove is preferably not less than 1.5 mm and preferably not greater than 3.0 mm.

A depth of the groove is preferably not less than 15% of a thickness of the projection and preferably not greater than 30% of the thickness of the projection.

A ratio (Wi/Wo) of a width Wi of a portion, of the projection, which is disposed inward of the groove in a radial direction relative to a width Wo of a portion, of the projection, which is disposed outward of the groove in the radial direction is preferably not less than 1.5 and preferably not greater than 2.5.

A ratio (Ti/To) of a thickness Ti of a portion, of the projection, which is disposed inward of the groove in a radial direction relative to a thickness To of a portion, of the projection, which is disposed outward of the groove in the radial direction is preferably not less than 0.95 and preferably not greater than 1.05.

The tire is preferably produced by using a mold which has a first part and a second part and has a dividing line, between the first part and the second part, which extends in the circumferential direction and comes into contact with the side surface. The groove preferably overlaps an imaginary line, on the side surface, corresponding to the dividing line.

The present invention is directed to a method for producing a tire comprising a projection on a side surface of the tire. The method includes: (1) a step of forming a raw cover for the tire; and (2) a step of vulcanizing the raw cover. In the step (2), the raw cover is pressurized and heated in a mold that has a first part and a second part which come into contact with the side surface, that has a dividing line, between the first part and the second part, which extends in a circumferential direction, that has a protrusion extending in the circumferential direction for forming, on an outer side surface of the projection, a groove extending in the circumferential direction, and that has the dividing line disposed such that the dividing line overlaps the protrusion.

DESCRIPTION OF THE PREFERRED EMBODIMENTS

The following will describe in detail the present invention based on preferred embodiments with reference where appropriate to the accompanying drawing.

Figure 1:
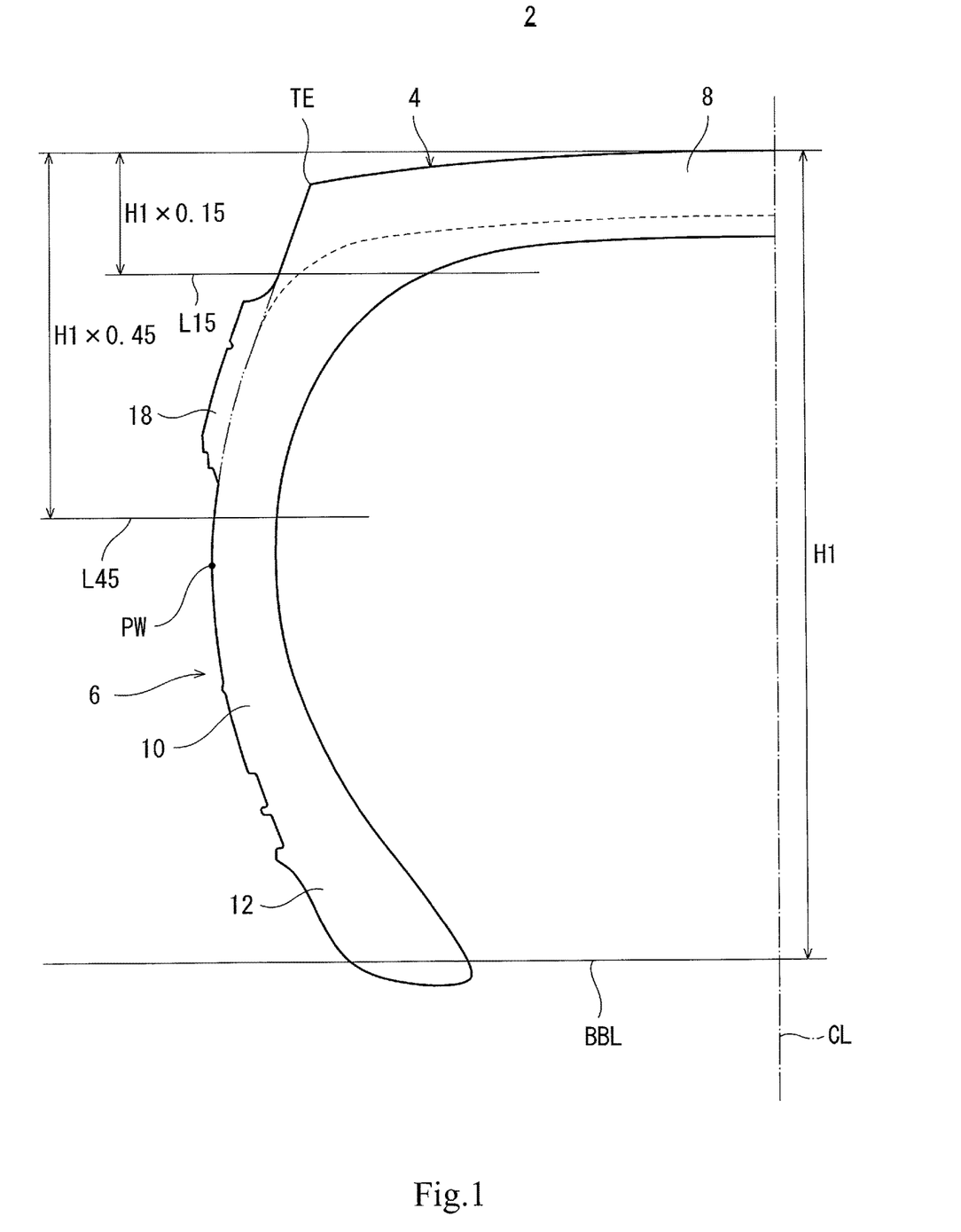
FIG. 1 illustrates an outline of a part of a cross-section of a tire according to one embodiment of the present invention.

FIG. 1 illustrates a pneumatic tire 2 according to one embodiment of the present invention. FIG. 1 shows an outline of a cross-section perpendicular to the circumferential direction of the tire 2. In FIG. 1, the up-down direction represents the radial direction of the tire 2, the left-right direction represents the axial direction of the tire 2, and the direction perpendicular to the surface of the drawing sheet represents the circumferential direction of the tire 2. In FIG. 1, an alternate long and short dash line CL represents the equator plane of the tire 2. A solid line BBL represents the bead base line. The bead base line BBL corresponds to a line that defines a rim diameter (see JATMA) of a rim on which the tire 2 is mounted.

Figure 2:
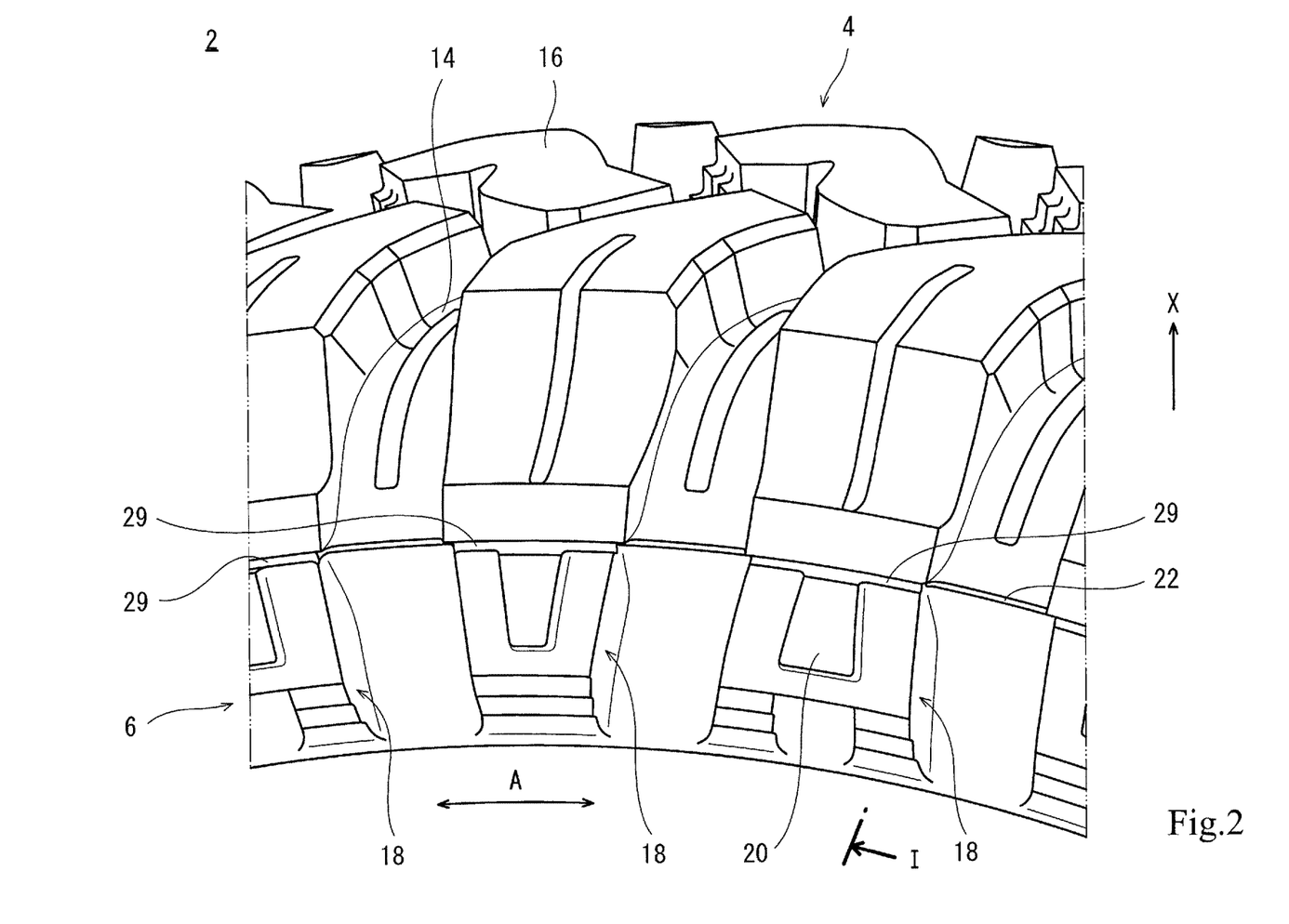
FIG. 2 is a perspective view of a part of an outer surface of the tire shown in FIG. 1.

FIG. 2 is a perspective view of a part of a tread surface 4 and a part of a side surface 6 in the tire 2. The side surface 6 represents a region, on the outer surface of the tire 2, which can be viewed in the axial direction. In FIG. 2, a double-headed arrow A represents the circumferential direction of the tire 2, and an arrow X represents the radial direction of the tire 2. FIG. 1 shows an outline of the cross-section, of the tire 2, obtained when the tire 2 is cut, at a position represented by a line I in FIG. 2, by the plane perpendicular to the circumferential direction.

The tire 2 includes a tread 8, sidewalls 10, clinches 12, beads, a carcass, a belt, and an inner line, which are not shown in detail in FIG. 1. The tread surface 4 is formed from the outer surface of the tread 8. The side surface 6 is mainly formed from the outer surface of the sidewall 10. The side surface 6 is also formed from a part of the outer surface of each of the clinch 12 and the tread 8. The tire 2 is of a tubeless type. The tire 2 is mounted to a passenger car.

As shown in FIG. 2, the tread surface 4 has grooves 14. The groove 14 extends in the axial direction and the circumferential direction so as to be curved. A portion, of the tread 8, surrounded by the grooves 14 is referred to as a block 16. The tread 8 has multiple blocks 16. In FIG. 1, reference character TE represents a tread end. The tread end TE is an outer side end, in the axial direction, of an imaginary tread surface 4 on the assumption that the grooves 14 are not provided.

In FIG. 1, reference character PW represents a position on the side surface 6. At the position PW, the tire 2 has the maximum width in the axial direction. The position PW is the maximum width position.

As shown in FIGS. 1 and 2, the tire 2 has a projection 18 on the side surface 6. The projection 18 is disposed between the tread end TE and the maximum width position PW. As shown in FIG. 2, a plurality of the projections 18 are aligned in the circumferential direction. As shown in FIG. 2, the projection 18 has a small projection 20 on the outer side surface thereof. A raised portion 22 that is tapered is disposed between the projections 18 adjacent to each other. In FIG. 1, the small projection 20 is not shown.

Figure 3:
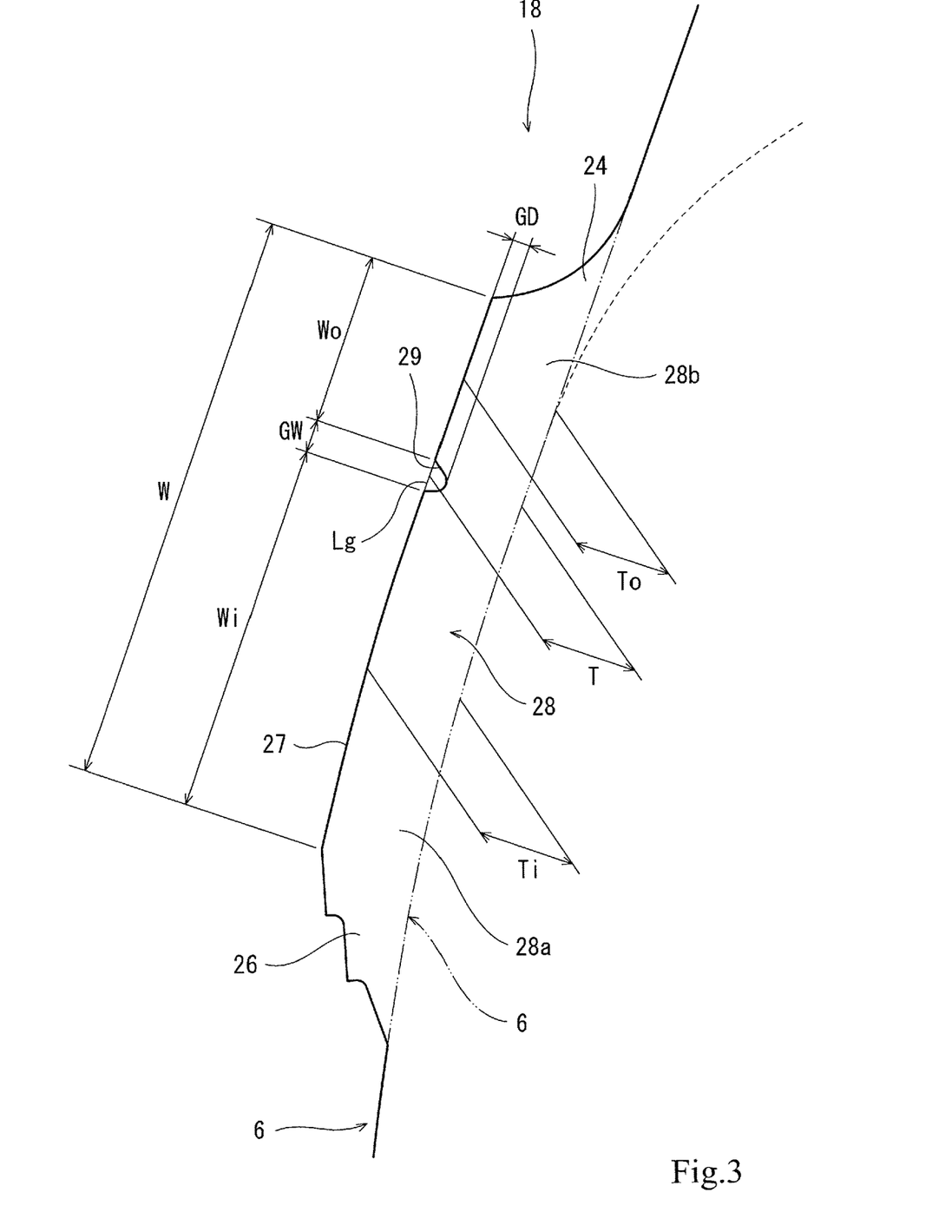
FIG. 3 is an enlarged view of a projection shown in FIG. 1.

FIG. 3 shows the projection 18 shown in FIG. 1 in an enlarged manner. As shown in FIG. 3, the radially outer side end portion of the projection 18 has a thickness reduced toward the outer side. This portion is referred to as an outer skirt 24 of the projection 18. The radially inner side end portion of the projection 18 has a thickness reduced toward the inner side. This portion is referred to as an inner skirt 26 of the projection 18. A portion between the outer skirt 24 and the inner skirt 26 is a body 28 of the projection 18. In other words, the projection 18 includes the body 28, the outer skirt 24, and the inner skirt 26.

As shown in FIG. 3, the projection 18 includes a groove 29 in an outer side surface 27. As shown in FIG. 2, the groove 29 extends in the circumferential direction. The groove 29 extends from one end of the projection 18 to the other end thereof in the circumferential direction. The groove 29 extends through the outer side surface 27 in the circumferential direction. In FIG. 3, an alternate long and two short dashes line represents the side surface 6 on the assumption that the projection 18 is not provided.

A method for producing the tire 2 includes a step of forming a raw cover, and a step of vulcanizing the raw cover. In the step of forming the raw cover, components of the tire 2 are assembled to form the raw cover. In the step of vulcanizing the raw cover, the raw cover is vulcanized in a mold.

Figure 4:
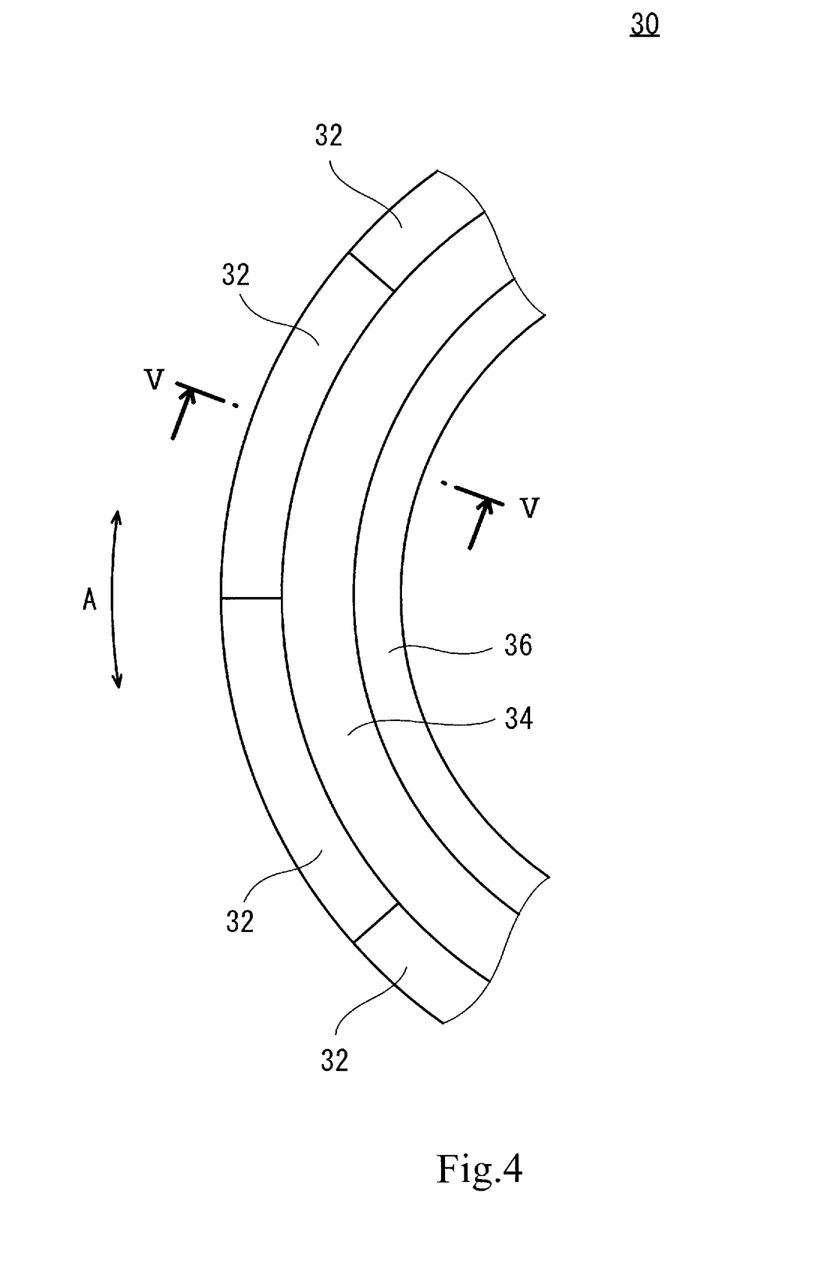
FIG. 4 is a plan view illustrating an example of a mold used for producing the tire shown in FIG. 1.
Figure 5:
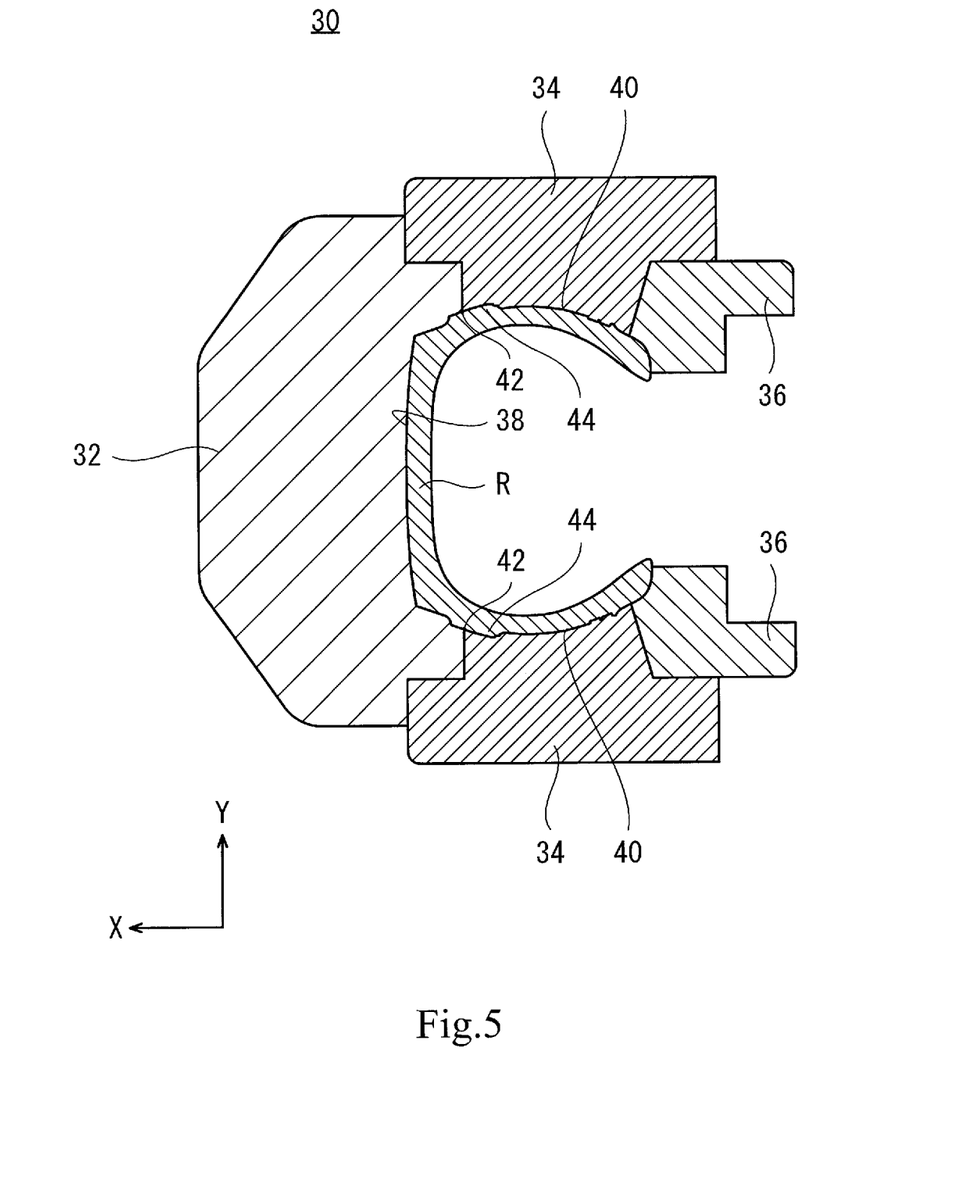
FIG. 5 is a cross-sectional view taken along a line V-V in FIG. 4.

FIGS. 4 and 5 illustrate an example of a mold 30. FIG. 4 is a plan view of the mold 30. In FIG. 4, the direction perpendicular to the surface of the drawing sheet represents the axial direction, and a direction indicated by a double-headed arrow A represents the circumferential direction. FIG. 5 is a cross-sectional view taken along a line V-V in FIG. 4. In FIG. 5, a direction indicated by an arrow X represents the radial direction, a direction indicated by an arrow Y represents the axial direction, and the direction perpendicular to the surface of the drawing sheet represents the circumferential direction. In FIG. 5, a raw cover R in the mold 30 is also shown.

As shown in FIGS. 4 and 5, the mold 30 includes a plurality of segments 32, a pair of side plates 34, and a pair of bead rings 36. These are referred to as constituent elements of the mold 30. As shown in FIG. 4, the planar shape of the segment 32 is a substantially arc-shape. The plurality of segments 32 are arranged so as to be ring-shaped. The side plates 34 and the bead rings 36 are each substantially ring-shaped.

In FIG. 5, the mold 30 is closed. In this state, inner surfaces of the segments 32, inner surfaces of the side plates 34, and inner surfaces of the bead rings 36 are combined to form a cavity surface. The cavity surface contacts with the raw cover R, to form an outer surface of the tire 2. A boundary between adjacent constituent elements on the cavity surface is referred to as a dividing line.

As shown in FIG. 5, a tread surface 38 of the raw cover R contacts with the inner surfaces of the segments 32. The inner surfaces of the segments 32 have peaks corresponding to the grooves 29 of the tread surface 4, which is not shown. Side surfaces 40 of the raw cover R contact with the inner surfaces of the segments 32 and the inner surfaces of the side plates 34. The radially outer side portion of the side surface 40 of the raw cover R contacts with the inner surface of the segment 32. The radially inner side portion of the side surface 40 of the raw cover R contacts with the inner surface of the side plate 34. A dividing line 42 between the segment 32 and the side plate 34 contacts with the side surface 40.

Figure 6:
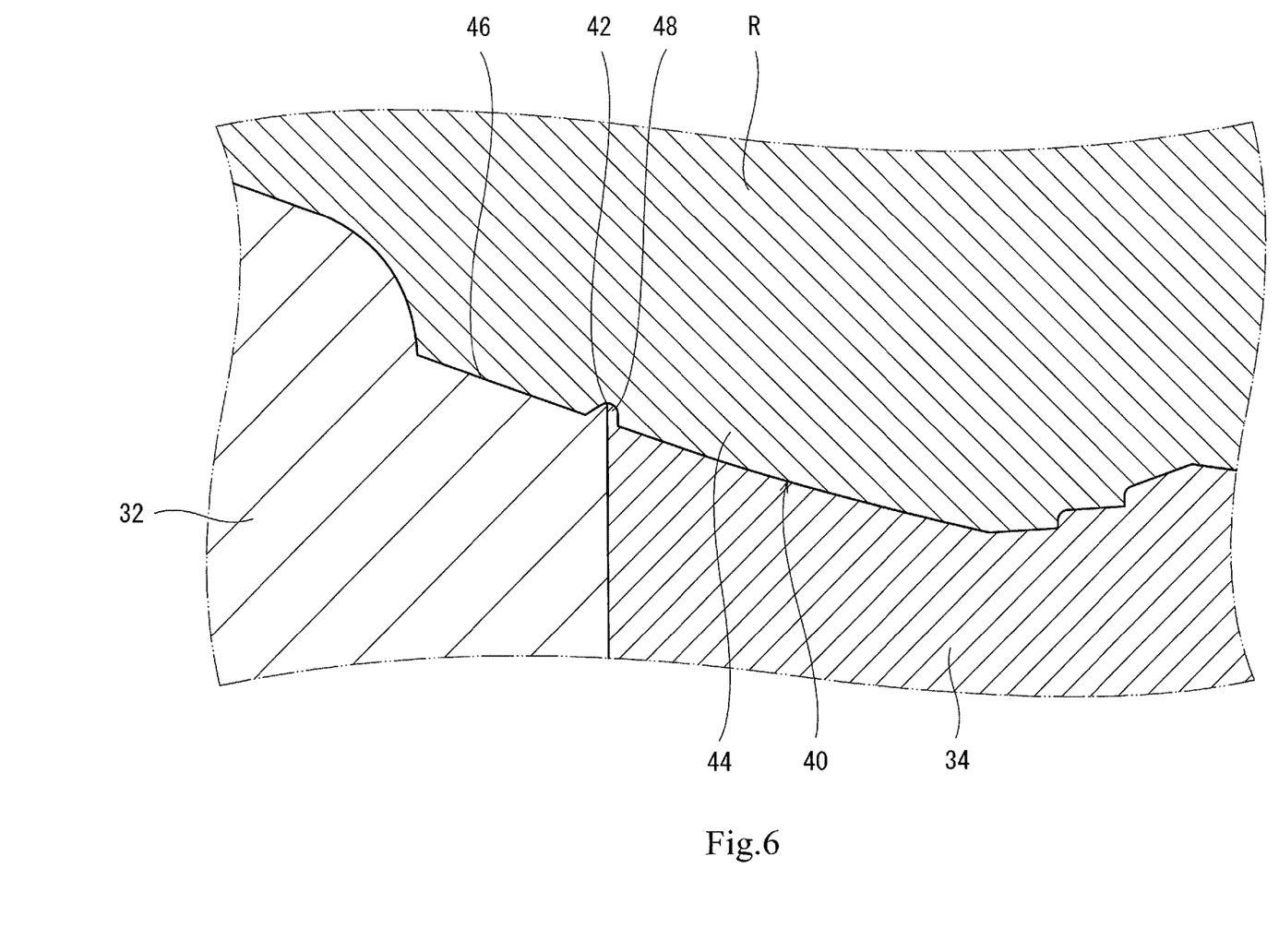
FIG. 6 is an enlarged cross-sectional view of a part of the mold shown in FIG. 5.

FIG. 6 is an enlarged view of a portion near the dividing line 42 between the segment 32 and the side plate 34 which are shown in FIG. 5. As shown in FIG. 6, a projection 44 of the side surface 40 of the raw cover R contacts with the inner surface of the segment 32 and the inner surface of the side plate 34. The projection 44 contacts with the dividing line 42 between the segment 32 and the side plate 34. A recess 46 for forming the projection 18 of the tire 2 is formed in the inner surface of the segment 32 and the inner surface of the side plate 34. A protrusion 48 for forming the groove 29 of the outer side surface 27 of the projection 18 is formed at the bottom of the recess 46. The protrusion 48 extends in the circumferential direction. In the mold 30, the protrusion 48 overlaps the dividing line 42 between the segment 32 and the side plate 34.

The raw cover R in the mold 30 is pressurized and heated in the mold 30. A rubber composition of the raw cover R flows due to the pressurizing and heating. The rubber causes crosslinking reaction due to the heating to obtain the tire 2.

As described above, the protrusion 48, of the mold 30, for forming the groove 29 of the projection 18 of the tire 2 overlaps the dividing line 42 between the segment 32 and the side plate 34. In other words, in the tire 2 produced by using the mold 30, when VL represents an imaginary line, on the side surface 6, corresponding to the dividing line 42, the groove 29 of the projection 18 overlaps the imaginary line VL.

The mold 30 used for producing the tire 2 is not limited to the mold 30 having the structure shown in FIGS. 4 and 5. The mold may be any mold which has a first part and a second part that come into contact with the side surface 6 of the tire 2, and in which the dividing line between the first and the second parts extends in the circumferential direction, a protrusion for forming the groove 29 in the projection 18 extends in the circumferential direction, and the dividing line overlaps the protrusion. In the mold 30 shown in FIGS. 4 and 5, the segment 32 corresponds to the first part and the side plate 34 corresponds to the second part.

Hereinafter, the actions and effects of the present invention will be described.

In the tire 2 according to the present invention, the projection 18 is disposed between the tread end TE and the maximum width position PW on the side surface 6. The projection 18 disposed between the tread end TE and the maximum width position PW contributes to protection of the side surface 6. The projection 18 contributes to outer appearance of the tire 2.

In the tire 2, the projection 18 includes the groove 29 that extends through the outer side surface 27 in the circumferential direction. The groove 29 effectively reduces distortion of the outer side surface 27 of the projection 18 when the side surface 6 is deformed. In the tire 2, even when the large projection 18 is disposed, the outer side surface 27 of the projection 18 is prevented from becoming an originating point of damage. The large projection 18 effectively protects the side surface 6. The large projection 18 can effectively contribute to enhancing of outer appearance. In the tire 2, damage is prevented while good cut resistance and outer appearance are obtained.

In FIG. 1, a double-headed arrow H1 represents a cross-sectional height of the tire 2. A straight line L15 represents a straight line that extends in the axial direction at a position where a distance from the outer side end of the tire 2 is 15% of the height H1 in the radial direction. A straight line L45 represents a straight line that extends in the axial direction at a position where a distance from the outer side end of the tire 2 is 45% of the height H1 in the radial direction. In the tire, the groove 29 is preferably disposed in a region between the straight line L15 and the straight line L45. Deformation is great in the region between the straight line L15 and the straight line L45 when the tire 2 rolls. Distortion of the outer side surface 27 of the projection 18 disposed in this region tends to increase. By the groove 29 being disposed in this region, the groove 29 effectively reduces distortion of the outer side surface 27 of the projection 18. In the tire 2, the outer side surface 27 of the projection 18 is prevented from becoming an originating point of damage.

In the tire 2, the entirety of the projection 18 that includes the inner skirt 26 and the outer skirt 24 is preferably disposed in the region between the straight line L15 and the straight line L45. The projection 18 disposed in this region effectively contributes to protection of the side surface 6. The projection 18 disposed in this region is likely to be conspicuous. The projection 18 effectively contributes to the outer appearance of the tire 2.

The tire 2 is pressurized and heated in the mold 30. At this time, adjacent constituent elements of the mold 30 may be displaced from each other. For example, the segment 32 of the mold 30 shown in FIG. 5 may be displaced from a predetermined position relative to the side plate 34 by several millimeters. As illustrated in the mold 30 shown in FIG. 5, the dividing line of the mold contacts with the side surface of a raw cover in general. The dividing line may contact with the projection on the side surface. Displacement between the constituent elements, of the mold, which form the dividing line may cause distortion of the shape of the projection of the tire. The projection on the side surface is likely to be conspicuous. This particularly exerts an influence on the outer appearance of the tire. It is important to inhibit the outer appearance of the tire from being influenced by displacement between the constituent elements of the mold.

In the tire 2, the groove 29 of the projection 18 overlaps the imaginary line VL, on the side surface 6, corresponding to the dividing line 42 between the segment 32 and the side plate 34. Even when the segment 32 and the side plate 34 are displaced from each other, distortion of the shape of the projection 18 is less likely to be conspicuous. In the tire 2, the outer appearance is inhibited from being influenced by displacement between the constituent elements of the mold 30. The tire 2 can have excellent outer appearance.

In FIG. 3, a straight line Lg represents an imaginary line that connects between both ends, in the radial direction, of an opening of the groove 29. A double-headed arrow GD represents a depth of the groove 29. The depth GD represents a distance from the straight line Lg to the bottom of the groove 29. A double-headed arrow T represents a thickness of the projection 18. The thickness T is measured at a position of the groove 29. Specifically, the thickness T represents a distance from the straight line Lg to the side surface 6 on the assumption that the projection 18 is not provided, and the distance is measured along the line that is perpendicular to the straight line Lg and is drawn from the center of the straight line Lg. The thickness T is measured on the assumption that the small projection 20 is not disposed on the outer side surface 27 of the projection 18.

A ratio (GD/T) of the depth GD to the thickness T is preferably not less than 15%. When the ratio (GD/T) is not less than 15%, the groove 29 effectively reduces distortion of the outer side surface 27 of the projection 18. When the ratio (GD/T) is not less than 15%, distortion at the bottom of the groove 29 is inhibited when the side portion is deformed. In the tire 2, the outer side surface 27 and the bottom of the groove 29 in the projection 18 are prevented from becoming originating points of damage. In this viewpoint, the ratio (GD/T) is more preferably not less than 20%. The ratio (GD/T) is preferably not greater than 30%. When the ratio (GD/T) is not greater than 30%, the projection 18 can have sufficient cut resistance. When collision against an obstacle or the like occurs, damage to the projection 18 is reduced. In this viewpoint, the ratio (GD/T) is more preferably not greater than 25%.

In FIG. 3, a double-headed arrow GW represents a width of the groove 29. The width GW corresponds to the length of the straight line Lg. The width GW is preferably not less than 1.5 mm. When the width GW is not less than 1.5 mm, the groove 29 effectively reduces distortion of the outer side surface 27 of the projection 18. When the width GW is not less than 1.5 mm, distortion at the bottom of the groove 29 is inhibited when the side portion is deformed. The outer side surface 27 and the bottom of the groove 29 in the projection 18 are prevented from becoming originating points of damage. In this viewpoint, the width GW is more preferably not less than 1.8 mm. The width GW is preferably not greater than 3.0 mm. When the width GW is not greater than 3.0 mm, the projection 18 can have sufficient cut resistance. When collision against an obstacle or the like occurs, damage to the projection 18 is reduced. Furthermore, when the width GW is not greater than 3.0 mm, unity in design of the projection 18 is maintained. The tire 2 has excellent outer appearance. In this viewpoint, the width GW is more preferably not greater than 2.5 mm.

The thickness T is preferably not less than 4.0 mm. When the thickness T is not less than 4.0 mm, the projection 18 effectively contributes to protection of the side surface 6. The tire 2 can have excellent cut resistance. Furthermore, the projection 18 is likely to be conspicuous. The projection 18 effectively contributes to outer appearance of the tire 2. In this viewpoint, the thickness T is more preferably not less than 5.0 mm. The thickness T is preferably not greater than 8.0 mm. When the thickness T is not greater than 8.0 mm, influence of the projection 18 on the mass of the tire 2 is reduced. In this viewpoint, the thickness T is more preferably not greater than 7.0 mm.

A portion, of the body 28 of the projection 18, which is disposed radially inward of the groove 29 is referred to as an inner body 28a. A portion, of the body 28 of the projection 18, which is disposed radially outward of the groove 29 is referred to as an outer body 28b. In FIG. 3, a double-headed arrow Wi represents a width of the inner body 28a. The width is measured along the outer side surface 27 of the body 28. A double-headed arrow Wo represents a width of the outer body 28b. The width is measured along the outer side surface 27 of the body 28.

A ratio (Wi/Wo) of the width Wi to the width Wo is preferably not less than 1.5. Deformation is great in a radially outer side portion of the side surface 6 when the tire 2 rolls. Distortion is likely to be greater in the outer body 28b than in the inner body 28a. When the ratio (Wi/Wo) is not less than 1.5, the outer body 28b can be made small. This effectively reduces distortion of the outer side surface 27 of the outer body 28b. In the tire 2, the outer side surface 27 of the outer body 28b is prevented from becoming an originating point of damage. The ratio (Wi/Wo) is preferably not greater than 2.5. When the ratio (Wi/Wo) is not greater than 2.5, the size of the inner body 28a can be appropriately regulated. This effectively reduces distortion of the outer side 27 of the inner body 28a. In the tire 2, the outer side surface 27 of the inner body 28a is prevented from becoming an originating point of damage.

In FIG. 3, a double-headed arrow Ti represents a thickness of the inner body 28a. The thickness Ti is measured at the center, in the width direction, of the inner body 28a. The thickness Ti is measured on the assumption that the small projection 20 is not disposed on the outer side surface 27 of the projection 18. A double-headed arrow To represents a thickness of the outer body 28b. The thickness To is measured at the center, in the width direction, of the outer body 28b. A ratio (Ti/To) of the thickness Ti to the thickness To is preferably not less than 0.95 and preferably not greater than 1.05. When the ratio (Ti/To) is not less than 0.95 and not greater than 1.05, difference in distortion between the inner body 28a and the outer body 28b is prevented from increasing. In the tire 2, the outer side surface 27 of the projection 18 is prevented from becoming an originating point of damage.

In FIG. 3, a double-headed arrow W represents a width of the body 28. The width is measured along the outer side surface 27 of the body 28. A ratio (W/H1) of the width W to the cross-sectional height H1 is preferably not less than 10%. When the ratio (W/H1) is not less than 10%, the projection 18 effectively contributes to protection of the side surface 6. The tire 2 has excellent cut resistance. Furthermore, the projection 18 is likely to be conspicuous. The projection 18 effectively contributes to outer appearance of the tire 2. The ratio (W/H1) is preferably not greater than 25%. When the ratio (W/H1) is not greater than 25%, distortion at the outer side surface 27 of the projection 18 is effectively inhibited.

In the present invention, the dimensions and angles of the components of the tire 2 are measured in a state where the tire 2 is mounted on a normal rim, and inflated with air to a normal internal pressure. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

EXAMPLES

Example 1

A tire shown in FIG. 1 was produced. The size of the tire was 285/70R17. The specifications of the projection disposed on the side surface of the tire are indicated in Table 1. The tire was produced using the mold shown in FIGS. 4 to 6. The imaginary line, on the side surface, corresponding to the dividing line between the segment and the side plate in the mold overlapped the groove. The ratio (W/H1) was 15%, and the thickness T was 6 mm.

Comparative Example 1

A tire of comparative example 1 (abbreviated as "Comp. Ex. 1") was obtained in the same manner as for example 1 except that the projection had no grooves. Since the projection had no grooves, the imaginary line, on the side surface, corresponding to the dividing line did not overlap a groove.

Examples 2 to 3

Tires of examples 2 to 3 were each obtained in the same manner as for example 1 except that the ratio (GD/T) had a value indicated in Table 1.

Examples 4 to 5

Tires of examples 4 to 5 were each obtained in the same manner as for example 1 except that the width GW of the groove had a value indicated in Table 1.

[Distortion of Outer Side Surface]

Each tire was mounted on a normal rim (size=7.5 J), and inflated with air to a normal internal pressure. A vertical load corresponding to the maximum applied load defined in JATMA was applied to the tire. For each of the tires of examples and comparative example, variation values of the widths, on the outer side surfaces, of all the projections were measured, and the largest value was obtained. For the tires of examples, the sum of the variation value of the width, on the outer side surface, of the outer body, and the variation value of the width, on the outer side surface, of the inner body was used as the variation value of the width, on the outer side surface, of the projection. For the tire of comparative example 1, the variation value of the width, on the outer side surface, of the body was used as the variation value of the width, on the outer side surface, of the projection. Based on the reciprocal of each of the largest values, distortion of the outer side surface was evaluated. The results are each indicated in Table 1 as an index with the index of comparative example 1 being 100. The greater the value of the index is, the better the evaluation is.

[Distortion of Groove Bottom]

Each tire was mounted on a normal rim (size=7.5 J), and inflated with air to a normal internal pressure. A vertical load corresponding to the maximum applied load defined in JATMA was applied to the tire. For each of the tires of examples and comparative example, variation values of the widths near the groove bottoms (a portion in a range in which a distance from the mid-point of the deepest portion of the groove was not greater than 0.1 mm) of all the projections were measured, and the largest value was obtained. Based on the largest value, distortion of the groove bottom was evaluated. The results are each indicated in Table 1 as an index with the index of example 1 being 100. The greater the value of the index is, the better the evaluation is.

[Cut Resistance]

Each tire was mounted on a normal rim (size=7.5 J), and mounted to a rear-wheel-drive passenger car. The internal pressure of the tire was a normal internal pressure. After the mounting, a vertical load corresponding to the maximum applied load defined in JATMA was applied to the tire. The vehicle was driven by a driver so as to run, by 1000 km, on a rally course called "dirt course" in Japan. Thereafter, the tire was dismounted from the rim. The side surface of the tire was visually observed, and the number of cracks and the sizes thereof were confirmed. The results are each indicated in Table 1 as an index with the index of comparative example 1 being 100. The greater the value of the index is, the better the evaluation is. The greater the value of the index is, the more excellent cut resistance is.

[Outer Appearance in the Case of Displacement in Mold being Generated]

When each tire was produced, displacement in position by 0.5 mm was generated between the segment and the side plate. The outer appearance of the completed tire was visually observed. The results are each indicated in column of "Outer appearance" in Table 1 as an index with the index of comparative example 1 being 100. The greater the value of the index is, the better the evaluation is.

As indicated in Table 1, comprehensive evaluation of the tires of examples is high. The evaluation result clearly indicates that the present invention is superior.

The tire according to the present invention is applicable to various vehicles.

The foregoing description is in all aspects illustrative, and various modifications can be devised without departing from the essential features of the invention.

What is claimed is:

1. A tire comprising:
   a plurality of projections spaced apart in the circumferential direction and disposed between a tread end and a maximum width position on a side surface of the tire; and
   tread having a plurality of blocks extending to the tread end, wherein
   each of the plurality of projections includes only a single groove that extends through an outer side surface of its projection in the circumferential direction,
   the entirety of each groove is disposed outward of the center of its projection in a radial direction,
   a depth of each groove is not less than 15% of a thickness of its projection and not greater than 30% of the thickness of its projection, and
   each of the plurality of projections is formed continuously with a corresponding block.

2. The tire according to claim 1, wherein each groove is disposed in a region in which a distance from an outer side end of the tire is 15% to 45% of a cross-sectional height H1 of the tire in the radial direction.

3. The tire according to claim 1, wherein a width of each groove is not less than 1.5 mm and not greater than 3.0 mm.

4. The tire according to claim 1, wherein a ratio (Wi/Wo) of a width Wi of a portion, of each projection, which is disposed inward of its groove in the radial direction relative to a width Wo of a portion, of the projection, which is disposed outward of its groove in the radial direction is not less than 1.5 and not greater than 2.5.

5. The tire according to claim 1, wherein a ratio (Ti/To) of a thickness Ti of a portion, of each projection, which is disposed inward of its groove in the radial direction relative to a thickness To of a portion, of the projection, which is disposed outward of its groove in the radial direction is not less than 0.95 and not greater than 1.05.

6. The tire according to claim 1, wherein the tire is produced by using a mold which has a first part and a second part and has a dividing line, between the first part and the second part, which extends in the circumferential direction and comes into contact with the side surface, and

TABLE 1

| | Evaluation result | | | | |
|---|---|---|---|---|---|
| | Comp. Ex. 1 | Example 2 | Example 1 | Example 3 | Example 4 | Example 5 |
| Ratio (GD/T) [%] | — | 15 | 20 | 30 | 20 | 20 |
| Groove width GW [mm] | — | 2.0 | 2.0 | 2.0 | 1.5 | 3.0 |
| Ratio (Wi/Wo) | — | 2.0 | 2.0 | 2.0 | 2.0 | 2.0 |
| Ratio (Ti/To) | — | 1.0 | 1.0 | 1.0 | 1.0 | 1.0 |
| Distortion of outer side surface | 100 | 102 | 105 | 105 | 102 | 102 |
| Distortion of groove bottom | — | 100 | 100 | 98 | 98 | 102 |
| Cut resistance | 100 | 100 | 100 | 100 | 100 | 100 |
| Outer appearance | 100 | 110 | 110 | 110 | 105 | 107 | each groove overlaps an imaginary line, on the side surface, corresponding to the dividing line.

7. A tire according to claim 1, wherein the plurality of spaced apart projections are aligned in the circumferential direction.

8. A tire according to claim 1, wherein each of the plurality of projections has a smaller projection on the outer side surface thereof.

9. A tire according to claim 1, wherein
the entirety of each projection is disposed between the tread end and the maximum width position on the side surface of the tire.

10. A tire according to claim 9, wherein a single projection is disposed between the tread end and the maximum width position on a side surface of the tire, at any given position in the circumferential direction of the tire.

11. A tire according to claim 1, wherein a single projection is disposed between the tread end and the maximum width position on the side surface of the tire, at any given position in the circumferential direction of the tire.

12. The tire according to claim 1, wherein each of the plurality of projections is only a single element.

13. A tire comprising:
a plurality of projections spaced apart in the circumferential direction and disposed between a tread end and a maximum width position on a side surface of the tire, wherein
each of the plurality of projections includes only a single groove that extends through an outer side surface of its projection in a circumferential direction,
the entirety of each groove is disposed outward of the center of its projection in a radial direction,
a depth of each groove is not less than 15% of a thickness of its projection and not greater than 30% of the thickness of its projection, and
each of the plurality of projections has a smaller projection on the outer side surface thereof.

14. A tire:
a plurality of projections spaced apart in the circumferential direction and disposed between a tread end and a maximum width position on a side surface of the tire, wherein
each of the plurality of projections includes only a single groove that extends through an outer side surface of its projection in a circumferential direction,
the entirety of each groove is disposed outward of the center of its projection in a radial direction,
a depth of each groove is not less than 15% of a thickness of its projection and not greater than 30% of the thickness of its projection, and
a plurality of raised portions, each disposed between adjacent projections of the plurality of projections and being tapered.

15. A tire comprising:
a plurality of projections spaced apart in the circumferential direction and disposed between a tread end and a maximum width position on a side surface of the tire, and
tread having a plurality of blocks extending to the tread end, wherein
each of the plurality of projections includes only a single groove that extends through an outer side surface of its projection in a circumferential direction, and
a ratio (Wi/Wo) of a width Wi of a portion, of each of the projections, which is disposed inward of its groove in a radial direction relative to a width Wo of a portion, of the projection, which is disposed outward of its groove in the radial direction is not less than 1.5 and not greater than 2.5,
a depth of each groove is not less than 15% of a thickness of its projection and not greater than 30% of the thickness of its projection, and
each of the plurality of projections is formed continuously with a corresponding block.

* * * * *

UNITED STATES PATENT AND TRADEMARK OFFICE
CERTIFICATE OF CORRECTION

PATENT NO. : 11,400,761 B2
APPLICATION NO. : 16/281664
DATED : August 2, 2022
INVENTOR(S) : R. Notsu It is certified that error appears in the above-identified patent and that said Letters Patent is hereby corrected as shown below:

In the Claims

At Column 12, Line 1 (Claim 14, Line 1), please change "tire:" to -- tire comprising: --.

Signed and Sealed this
Tenth Day of January, 2023

Katherine Kelly Vidal
*Director of the United States Patent and Trademark Office*